(12) United States Patent
Tsuda et al.

(10) Patent No.: US 9,096,701 B2
(45) Date of Patent: Aug. 4, 2015

(54) AQUEOUS TETRAFLUOROETHYLENE POLYMER DISPERSION, PROCESS FOR PRODUCING THE SAME, TETRAFLUOROETHYLENE POLYMER POWDER, AND MOLDED TETRAFLUOROETHYLENE POLYMER

(75) Inventors: Nobuhiko Tsuda, Settsu (JP); Yoshinori Nanba, Settsu (JP); Yasuhiko Sawada, Settsu (JP); Tetsuo Shimizu, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/599,986

(22) Filed: Aug. 30, 2012

(65) Prior Publication Data

US 2012/0322941 A1  Dec. 20, 2012

Related U.S. Application Data

(62) Division of application No. 10/576,450, filed as application No. PCT/JP2004/015718 on Oct. 22, 2004, now abandoned.

(30) Foreign Application Priority Data

Oct. 22, 2003  (JP) ................ 2003-362500

(51) Int. Cl.
*C08F 214/26*  (2006.01)
*C08F 14/26*  (2006.01)

(52) U.S. Cl.
CPC ............ *C08F 214/26* (2013.01); *C08F 14/26* (2013.01)

(58) Field of Classification Search
CPC .................................. C08F 214/26
USPC .................................. 526/247, 255
See application file for complete search history.

(56) References Cited

U.S. PATENT DOCUMENTS

| | | | |
|---|---|---|---|
| 3,009,892 A * | 11/1961 | Duddington et al. | 524/723 |
| 3,546,186 A * | 12/1970 | Sullivan et al. | 526/245 |
| 4,326,046 A * | 4/1982 | Miyaka et al. | 525/276 |
| 5,670,593 A | 9/1997 | Araki et al. | |
| 5,804,650 A * | 9/1998 | Tsuda et al. | 524/805 |
| 5,856,394 A | 1/1999 | Hirashima et al. | |
| 5,925,705 A | 7/1999 | Araki et al. | |
| 6,069,215 A * | 5/2000 | Araki et al. | 526/245 |
| 2003/0130393 A1 | 7/2003 | Cavanaugh et al. | |
| 2003/0162027 A1* | 8/2003 | Araki et al. | 428/421 |
| 2003/0181572 A1 | 9/2003 | Tan et al. | |
| 2004/0192828 A1 | 9/2004 | Mitsuhata et al. | |

FOREIGN PATENT DOCUMENTS

| | | |
|---|---|---|
| EP | 0 219 065 A2 | 4/1987 |
| EP | 0 939 105 A1 | 9/1999 |
| EP | 1 217 014 A1 | 6/2002 |
| JP | 59-196308 | 11/1984 |
| JP | 59-196308 A | 11/1984 |
| JP | 60-250009 | 12/1985 |
| JP | 61-033848 B2 | 8/1986 |
| JP | 62-288614 | 12/1987 |
| JP | 62-288615 | 12/1987 |
| JP | 62-288616 | 12/1987 |
| JP | 8-67795 | 3/1996 |
| JP | 2001-64304 A | 3/2001 |
| JP | 2002-308914 A | 10/2002 |
| WO | 9508598 A1 | 3/1995 |
| WO | 9533782 A1 | 12/1995 |
| WO | 03002660 A1 | 1/2003 |

OTHER PUBLICATIONS

Machine Translation of WO 95033782 A1.

* cited by examiner

*Primary Examiner* — Nicole M Buie-Hatcher
(74) *Attorney, Agent, or Firm* — Sughrue Mion, PLLC

(57) ABSTRACT

The present invention provides a tetrafluoroethylene polymer aqueous dispersion obtained by carrying out a TFE polymerization in an aqueous medium in the presence of a fluorovinyl group-containing emulsifier, wherein the TFE polymer aqueous dispersion contains a particle comprising a TFE polymer dispersed in the aqueous medium, the fluorovinyl group-containing emulsifier comprises a fluorovinyl group-containing compound, and the TFE polymer aqueous dispersion has a fluorine-containing surfactant content of not higher than 1000 ppm by mass.

3 Claims, No Drawings

AQUEOUS TETRAFLUOROETHYLENE POLYMER DISPERSION, PROCESS FOR PRODUCING THE SAME, TETRAFLUOROETHYLENE POLYMER POWDER, AND MOLDED TETRAFLUOROETHYLENE POLYMER

CROSS-REFERENCE TO RELATED APPLICATIONS

This is a Divisional of application Ser. No. 10/576,450 filed Apr. 20, 2006, which is a 371 of PCT Application No. PCT/JP2004/015718 filed Oct. 22, 2004, which claims benefit to Japanese Patent Application No. 2003-362500 filed Oct. 22, 2003. The above-noted applications are incorporated herein by reference in their entirety.

TECHNICAL FIELD

This invention relates to an aqueous tetrafluoroethylene [TFE] polymer dispersion, a method of producing the same, a TFE polymer powder, and a TFE polymer molding.

BACKGROUND ART

Patent Document 1 (Japanese Patent Publication (Kokoku) S61-33848) describes a method for producing an aqueous dispersion containing vinylidene fluoride [VdF]/TFE/hexafluoropropylene-based fluorine-containing elastomer particles with a particle diameter of 0.02 μm as dispersed therein which comprises carrying out the polymerization reaction in the presence of a fluorine-based surfactant having a polymerizable double bond represented by the formula $CF_2$=$CFO(CF_2)nCOOM$ (in which n is an integer of 1 to 7 and M is an amine or alkali metal). However, there is no description about an aqueous dispersion containing a polymer having a high TFE monomer unit content.

Patent Document 2 (Japanese Kokai Publication H08-67795) describes a method for producing an aqueous dispersion containing VdF-based polymer particles with a particle diameter of not greater than 200 nm as dispersed therein at a concentration of not lower than 30% by mass which method comprises carrying out the polymerization reaction in the presence of at least one of various fluorine-containing surfactants having polymerizable double bonds. However, there is no description about an aqueous dispersion containing a polymer having a high TFE monomer unit content or about the fluorine-containing surfactant content in the aqueous VdF-based polymer dispersion obtained.

Patent Document 3 (Japanese Kokai Publication S60-250009), Patent Document 4 (Japanese Kokai Publication S62-288614) and Patent Document 5 (Japanese Kokai Publication S62-288616) respectively describe copolymers derived from a monomer represented by $CF_2$=$CFO(CF_3)SO_2F$ and TFE, copolymers derived from a monomer represented by $CF_2$=$CFOCF_2CF(CF_3)OCF_2CF_2SO_2F$ and TFE, and copolymer derived from a monomer represented by $CF_2$=$CFOCF_2(CF_3)OCF_2CF_2SO_2F$ and TFE. In each case, the polymerization is carried out in the presence of a relatively large amount of a fluorine-based surfactant and, further, there is no description referring to the fact that a stable aqueous dispersion containing a particle comprising a TFE polymer very small in diameter is obtained.

DISCLOSURE OF INVENTION

Problems which the Invention is to Solve

In view of the above-discussed state of the art, it is an object of the invention to provide a high-concentration stable TFE polymer aqueous dispersion in spite of the fact that the polymerization is carried out in the absence or at a low concentration of a fluorine-containing surfactant.

The present invention provides a tetrafluoroethylene polymer aqueous dispersion obtained by carrying out a tetrafluoroethylene polymerization in an aqueous medium in the presence of a fluorovinyl group-containing emulsifier, wherein the tetrafluoroethylene polymer aqueous dispersion contains a particle comprising a tetrafluoroethylene polymer dispersed in the aqueous medium, the fluorovinyl group-containing emulsifier comprises a fluorovinyl group-containing compound (I) represented by the general formula (I):

$$CF_2=CF-(CF_2)_a-Y \quad (I)$$

wherein a represents an integer of 1 to 10 and Y represents —$SO_3M$ or —COOM in which M represents H, $NH_4$ or an alkali metal, a fluorovinyl group-containing compound (II) represented by the general formula (II):

$$CF_2=CF-(CF_2C(CF_3)F)_b-Y \quad (II)$$

wherein b represents an integer of 1 to 5 and Y represents —$SO_3M$ or —COOM in which M represents H, $NH_4$ or an alkali metal, a fluorovinyl group-containing compound (III) represented by the general formula (III):

$$CF_2=CFO-(CFX)_c-Y \quad (III)$$

wherein X represents F or —$CF_3$, c represents an integer of 1 to 10 and Y represents —$SO_3M$ or —COOM in which M represents H, $NH_4$ or an alkali metal, a fluorovinyl group-containing compound (IV) represented by the general formula (IV):

$$CF_2=CFO-(CF_2CFXO)_d-(CF_2)_e-Y \quad (IV)$$

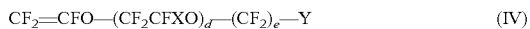

wherein X represents F or —$CF_3$, d represents an integer of 1 to 10, e represents an integer of 1 to 3 and Y represents —$SO_3M$ or —COOM in which M represents H, $NH_4$ or an alkali metal, a fluorovinyl group-containing compound (V) represented by the general formula (V):

$$CH_2=CFCF_2O-(CF(CF_3)CF_2O)_f-CF(CF_3)-Y \quad (V)$$

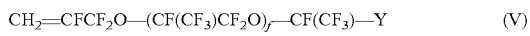

wherein f represents an integer of 0 to 10 and Y represents —$SO_3M$ or —COOM in which M represents H, $NH_4$ or an alkali metal, and/or a fluorovinyl group-containing compound (VI) represented by the general formula (VI):

$$CF_2=CFCF_2O-(CF(CF_3)CF_2O)_g-CF(CF_3)-Y \quad (VI)$$

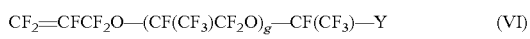

wherein g represents an integer of 1 to 10 and Y represents —$SO_3M$ or —COOM in which M represents H, $NH_4$ or an alkali metal, the tetrafluoroethylene polymer aqueous dispersion has a fluorine-containing surfactant content of not higher than 1000 ppm by mass.

The present invention also provides a tetrafluoroethylene polymer powder which is obtained by coagulating the tetrafluoroethylene polymer aqueous dispersion.

The present invention further provides a tetrafluoroethylene polymer molding which is obtained by molding/processing using the tetrafluoroethylene polymer aqueous dispersion or the tetrafluoroethylene polymer powder.

The present invention provides a method of producing a tetrafluoroethylene polymer aqueous dispersion by carrying out a tetrafluoroethylene polymerization in an aqueous medium in the presence of a fluorovinyl group-containing emulsifier, wherein the tetrafluoroethylene polymer aqueous dispersion contains a particle comprising a tetrafluoroethylene polymer dispersed in the aqueous medium and has a fluorine-containing surfactant content of not higher than 1000 ppm by mass, the fluorovinyl group-containing emulsifier is added in an amount of 0.00001 to 2% by mass relative to the aqueous medium, and the fluorovinyl group-containing emulsifier comprises a fluorovinyl group-containing compound (I) represented by the general formula (I):

$$CF_2=CF-(CF_2)_a-Y \quad (I)$$

wherein a represents an integer of 1 to 10 and Y represents —$SO_3M$ or —COOM in which M represents H, $NH_4$ or an alkali metal, a fluorovinyl group-containing compound (II) represented by the general formula (II):

$$CF_2=CF-(CF_2C(CF_3)F)_b-Y \quad (II)$$

wherein b represents an integer of 1 to 5 and Y represents —$SO_3M$ or —COOM in which M represents H, $NH_4$ or an alkali metal, a fluorovinyl group-containing compound (III) represented by the general formula (III):

$$CF_2=CFO-(CFX)_c-Y \quad (III)$$

wherein X represents F or —$CF_3$, c represents an integer of 1 to 10 and Y represents —$SO_3M$ or —COOM in which M represents H, $NH_4$ or an alkali metal, a fluorovinyl group-containing compound (IV) represented by the general formula (IV):

$$CF_2=CFO-(CF_2CFXO)_d-(CF_2)_e-Y \quad (IV)$$

wherein X represents F or —$CF_3$, d represents an integer of 1 to 10, e represents an integer of 1 to 3 and Y represents —$SO_3M$ or —COOM in which M represents H, $NH_4$ or an alkali metal, a fluorovinyl group-containing compound (V) represented by the general formula (V):

$$CH_2=CFCF_2O-(CF(CF_3)CF_2O)_f-CF(CF_3)-Y \quad (V)$$

wherein f represents an integer of 0 to 10 and Y represents —$SO_3M$ or —COOM in which M represents H, $NH_4$ or an alkali metal, and/or a fluorovinyl group-containing compound (VI) represented by the general formula (VI):

$$CF_2=CFCF_2O-(CF(CF_3)CF_2O)_g-CF(CF_3)-Y \quad (VI)$$

wherein g represents an integer of 1 to 10 and Y represents —$SO_3M$ or —COOM in which M represents H, $NH_4$ or an alkali metal.

In the following, the present invention is described in detail.

The TFE polymer aqueous dispersion of the invention is obtained by carrying out a TFE polymerization in an aqueous medium in the presence of a fluorovinyl group-containing emulsifier.

The fluorovinyl group-containing emulsifier comprises a fluorovinyl group-containing compound (I), a fluorovinyl group-containing compound (II), a fluorovinyl group-containing compound (III), a fluorovinyl group-containing compound (IV), a fluorovinyl group-containing compound (V) and/or a fluorovinyl group-containing compound (VI).

The fluorovinyl group-containing compound (I) is represented by the general formula (I):

$$CF_2=CF-(CF_2)_a-Y \quad (I)$$

wherein a represents an integer of 1 to 10 and Y represents —$SO_3M$ or —COOM in which M represents H, $NH_4$ or an alkali metal.

In the above general formula (I), the integer a is preferably not greater than 5, more preferably not greater than 2. The group Y is preferably —COOM since such can make it easy to attain proper solubility in water and surface activity, and M is preferably H or $NH_4$ since such can make it difficult for the compound (I) to remain in the TFE polymer.

The fluorovinyl group-containing compound (I) includes, among others, $CF_2=CF-CF_2-COONH_4$, $CF_2=CF-CF_2COOH$, $CF_2=CF-CF_2CF_2-COOH$, $CF_2=CF-CF_2-COONa$, $CF_2=CF-CF_2-SO_3NH_4$, $CF_2=CF-CF_2SO_3H$, $CF_2=CF-CF_2CF_2-SO_3H$ and $CF_2=CF-CF_2CF_2-SO_3Na$. Among them, $CF_2=CFCF_2-COONH_4$ is preferred since a stable aqueous dispersion of a TFE polymer relatively large in particle diameter can be readily obtained with the same.

The fluorovinyl group-containing compound (II) is represented by the general formula (II):

$$CF_2=CF-(CF_2C(CF_3)F)_b-Y \quad (II)$$

wherein b represents an integer of 1 to 5 and Y represents —$SO_3M$ or —COOM in which M represents H, $NH_4$ or an alkali metal.

In the above general formula (II), b is preferably an integer not greater than 3 from the surfactant activity viewpoint, and Y is preferably —COOM since such can make it easy to attain proper solubility in water and surface activity, and M is preferably H or $NH_4$ since such can make it difficult for the compound (II) to remain in the particles comprising the TFE polymer.

The fluorovinyl group-containing compound (II) includes, for example,

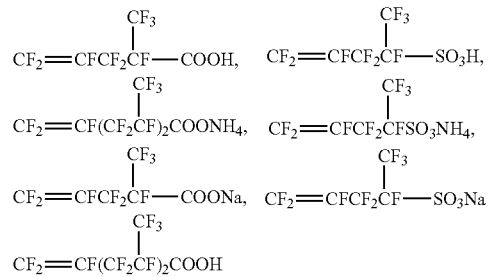

and the like. Among them,

is preferred since the use thereof readily renders particles comprising the TFE polymer smaller in particle diameter.

The fluorovinyl group-containing compound (III) is represented by the general formula (III):

$$CF_2=CFO-(CFX)_c-Y \quad (III)$$

wherein X represents F or —$CF_3$, c represents an integer of 1 to 10 and Y represents —$SO_3M$ or —COOM in which M represents H, $NH_4$ or an alkali metal.

In the above general formula (III), the moiety X is preferably —$CF_3$ since adequate levels of solubility in water and surface activity can be readily obtained in this case. The integer c is preferably an integer not greater than 5 from the solubility in water viewpoint, the moiety Y is preferably —COOM since such can make it easy to attain proper solubility in water and surface activity, and M is preferably H or NH$_4$ since such can make it difficult for the compound (III) to remain in the particles comprising the TFE polymer.

The fluorovinyl group-containing compound (III) includes, among others, CF$_2$=CF—OCF$_2$CF$_2$CF$_2$—COOH, CF$_2$=CF—OCF$_2$CF$_2$CF$_2$—COONa, CF$_2$=CF—OCF$_2$CF$_2$—COONH$_4$ and CF$_2$=CF—OCF$_2$—COOH. Among them, CF$_2$=CF—OCF$_2$CF$_2$CF$_2$—COOH is preferred since the use thereof readily renders particles comprising the TFE polymer smaller in particle diameter.

The fluorovinyl group-containing compound (IV) is represented by the general formula (IV):

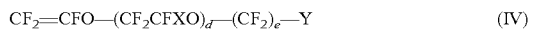

wherein X represents F or —CF$_3$, d represents an integer of 1 to 10, e represents an integer of 1 to 3 and Y represents —SO$_3$M or —COOM in which M represents H, NH$_4$ or an alkali metal.

In the above general formula (IV), the moiety X is preferably —CF$_3$ from the surfactant activity viewpoint, the integer d is preferably an integer not greater than 5 from the solubility in water viewpoint, the moiety Y is preferably —COOM since such can make it easy to attain proper solubility in water and surface activity, the integer e is preferably not greater than 2, and M is preferably H or NH$_4$.

The fluorovinyl group-containing compound (IV) includes, for example,

CF$_2$=CF—O—CF$_2$CF(CF$_3$)—OCF$_2$CF$_2$—COOH,

CF$_2$=CF—O—CF$_2$CF(CF$_3$)—OCF$_2$CF$_2$—COONH$_4$,

CF$_2$=CF—O—CF$_2$CF(CF$_3$)—OCF$_2$CF$_2$SO$_3$H,

CF$_2$=CF—O—CF$_2$CF(CF$_3$)—OCF$_2$CF$_2$SO$_3$NH$_4$ and the like. Among them,

CF$_2$=CF—O—CF$_2$CF(CF$_3$)—OCF$_2$CF$_2$—COOH,

CF$_2$=CF—O—CF$_2$CF(CF$_3$)—OCF$_2$CF$_2$—SO$_3$H are preferred since the use thereof readily renders particles comprising the TFE polymer smaller in particle diameter.

The fluorovinyl group-containing compound (V) is represented by the general formula (V):

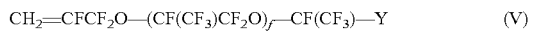

wherein f represents an integer of 0 to 10 and Y represents —SO$_3$M or —COOM in which M represents H, NH$_4$ or an alkali metal.

In the above general formula (V), the integer f is preferably an integer of 0 to 5 from the surfactant activity viewpoint, and Y is preferably —COOM since such makes it easy to attain proper solubility in water and surface activity, and M is preferably Na or NH$_4$ since such can make it difficult for the compound (V) to remain in the particles comprising the TFE polymer.

The fluorovinyl group-containing compound (V) includes, for example,

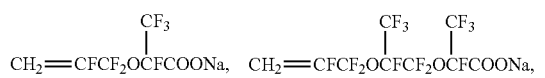

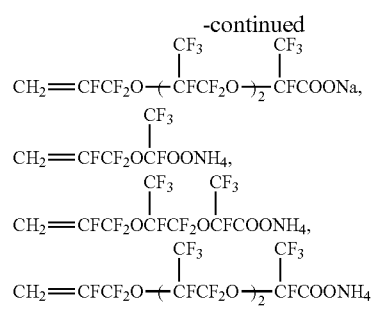

and the like. Among them, CH$_2$=CFCF$_2$OCF(CF$_3$)—COONH$_4$ and/or CH$_2$=CFCF$_2$OCF(CF$_3$)—CF$_2$OCF(CF$_3$)—COONH$_4$ is preferred since the use thereof readily renders particles comprising the TFE polymer smaller in particle diameter and makes it difficult for itself to remain in the particles comprising the TFE polymer.

The fluorovinyl group-containing compound (VI) is represented by the general formula (VI):

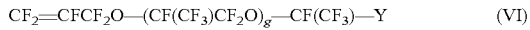

wherein g represents an integer of 1 to 10 and Y represents —SO$_3$M or —COOM in which M represents H, NH$_4$ or an alkali metal.

In the above general formula (VI), the integer g is preferably an integer not greater than 3 from the surfactant activity viewpoint, and the moiety Y is preferably —COOM since such makes it easy to attain proper solubility in water and surface activity. The moiety M is preferably H or NH$_4$ since such makes it difficult for the compound (VI) to remain in the particles comprising the TFE polymer.

The fluorovinyl group-containing compound (VI) includes, for example,

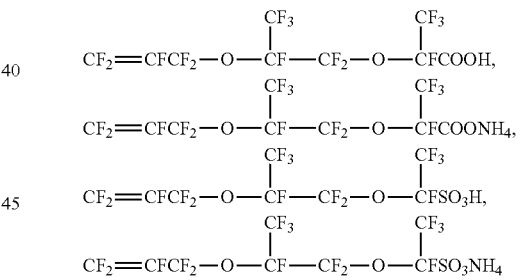

and the like. Among these, the following are preferred since the use thereof readily renders particles comprising the TFE polymer smaller in particle diameter:

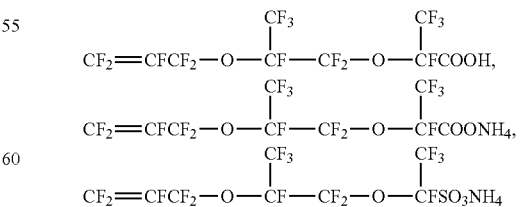

From the viewpoint that particles comprising the TFE polymer smaller in particle diameter can readily be obtained and a TFE polymer aqueous dispersion high in TFE polymer concentration can readily be obtained, the fluorovinyl group-containing emulsifier preferably comprises the fluorovinyl group-containing compound (I), fluorovinyl group-containing compound (II), fluorovinyl group-containing compound (III), fluorovinyl group-containing compound (IV) and/or fluorovinyl group-containing compound (V) and, more preferably, it comprises the fluorovinyl group-containing compound (II), fluorovinyl group-containing compound (III) and/or fluorovinyl group-containing compound (V).

From the viewpoint that particles comprising the TFE polymer smaller in particle diameter can readily be obtained, the fluorovinyl group-containing emulsifier still more preferably comprises a fluorovinyl group-containing compound (i) represented by the general formula (i):

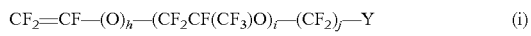

wherein h represents an integer of 0 or 1, j represents an integer of 0 to 2, j represents an integer of 1 to 3 and Y represents —$SO_3M$ or —COOM in which M represents H, $NH_4$ or an alkali metal, and/or a fluorovinyl group-containing compound (ii) represented by the general formula (ii):

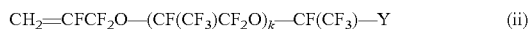

wherein k represents an integer of 0 to 3 and Y represents —$SO_3M$ or —COOM in which M represents H, $NH_4$ or an alkali metal.

In the above general formula (i), h is preferably 1, i is preferably 0 or 1, j is preferably 1 or 2, and Y is preferably —$SO_3Na$ or —$COONH_4$.

In the above general formula (ii), k is preferably 0 to 2 and Y is preferably —$COONH_4$ or —COONa.

Use may be made, as the fluorovinyl group-containing emulsifier, one or two or more of the six genera mentioned above, namely the fluorovinyl group-containing compound (I), fluorovinyl group-containing compound (II), fluorovinyl group-containing compound (III), fluorovinyl group-containing compound (IV), fluorovinyl group-containing compound (V) and fluorovinyl group-containing compound (VI), and each of the six fluorovinyl group-containing compound genera may comprise one or two or more species.

The above-mentioned fluorovinyl group-containing compounds can be prepared in the conventional manner.

The TFE polymer aqueous dispersion of the invention is obtained by carrying out the TFE polymerization in the presence of the above-mentioned fluorovinyl group-containing emulsifier, so that the TFE polymer concentration is high and the particles comprising the TFE polymer are small in particle diameter. Therefore, the TFE polymer aqueous dispersion of the invention contains particles comprising the TFE polymer excellent in moldability/processability and in physical properties, for example mechanical stability.

In the TFE polymer aqueous dispersion of the invention, the "aqueous medium" is the reaction medium for carrying out the polymerization therein and is a liquid containing water. The aqueous medium is not particularly restricted but may be any one containing water. In addition to water, it may contain a fluorine-free organic solvent such as an alcohol, ether, ketone or paraffin wax and/or a fluorine-containing organic solvent such as C318.

The TFE polymer aqueous dispersion of the invention may be any one obtained by carrying out the TFE polymerization in the above-mentioned aqueous medium in the presence of the above-mentioned fluorovinyl group-containing emulsifier and, thus, it may be one obtained by copolymerizing TFE and another monomer other than TFE.

The monomer other than TFE is not particularly restricted but may be, for example, another fluorine-containing monomer other than TFE or a fluorine-free monomer.

The "fluorine-containing monomer" may be mentioned, for example, a fluoroolefin, a fluorinated cyclic monomer or a fluorinated alkyl vinyl ether.

The fluoroolefin includes, among others, hexafluoropropylene [HFP], vinyl fluoride, vinylidene fluoride [VDF], trifluoroethylene, hexafluoroisobutylene and perfluorobutylethylene.

The fluorinated cyclic monomer includes perfluoro-2,2-dimethyl-1,3-dioxole [PDD] and perfluoro-2-methylene-4-methyl-1,3-dioxolane [PMD], among others.

The fluorinated alkyl vinyl ether includes, among others, ones represented by the formula $CZ^1{}_2$=$CZ^2OR^1$ or $CZ^1{}_2$=$CZ^2OR^2OR^1$ wherein the two $Z^1$s may be the same or different and each represents H or F, $Z^2$ is H or F, $R^1$ is an alkyl group containing 1 to 8 carbon atoms with a part or all of the hydrogen atoms being substituted by fluorine atoms and $R^2$ is an alkylene group containing 1 to 8 carbon atoms with a part or all of the hydrogen atoms being substituted by fluorine atoms.

Preferred as the fluorinated alkyl vinyl ether are, for example, perfluoro(methyl vinyl ether) [PMVE], perfluoro(ethyl vinyl ether) [PEVE] and perfluoro(propyl vinyl ether) [PPVE].

The fluorine-free monomer mentioned above is not particularly restricted but may be any one copolymerizable with TFE, for example a hydrocarbon-based monomer. The hydrocarbon-based monomer may be one containing one or more of non-fluorine halogen atoms, oxygen, nitrogen and like elements and various substituents.

As the above hydrocarbon-based monomers, there may be mentioned, for example, alkenes, alkyl vinyl ethers, vinyl esters, alkyl allyl ethers, and alkyl allyl esters.

The TFE polymer aqueous dispersion is generally obtained by carrying out the polymerization by adding a polymerization initiator to the above-mentioned fluorovinyl group-containing emulsifier, TFE and such an optionally added monomer other than TFE as mentioned above. Usable as the polymerization initiator are, for example, persulfate salts such as ammonium persulfate [APS] and organic peroxides such as disuccinoyl peroxide [DSP] and diglutaroyl peroxide, either singly or in the form of a mixture thereof. The polymerization initiator may be used in the form of a redox system through combined use of a reducing agent such as sodium sulfite. During polymerization, the radical concentration in the system may be adjusted by adding a radical scavenger such as hydroquinone or catechol or a peroxide decomposer such as ammonium sulfite.

The TFE polymer aqueous dispersion of the invention may also be one obtained by carrying out the polymerization using a fluorine-containing surfactant other than the fluorovinyl group-containing emulsifier mentioned above (hereinafter, such surfactant is referred to as "non-byproduct fluorine-containing surfactant"), one or more of such additives known in the art as chain transfer agents and radical scavengers in addition to the above-mentioned fluorovinyl group-containing emulsifier, TFE and such an optional polymerization initiator and/or monomer other than TFE as mentioned above.

The term "non-byproduct fluorine-containing surfactant" as used herein means a compound containing at least one fluorine atom in the molecular structure thereof and having surfactant activity, which is to be added on the occasion of the above-mentioned TFE polymerization. The "non-byproduct fluorine-containing surfactant" is conceptually different from the short-chain byproduct fluorine-containing surfactant to be described later herein as formed as a byproduct upon TFE polymerization in that it is added on the occasion of TFE polymerization.

As the non-byproduct fluorine-containing surfactant, there may be mentioned, for example, carboxylic acid compounds represented by

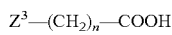

$Z^3$—$(CH_2)_n$—COOH wherein $Z^3$ represents F or H and n represents an integer of 3 to 20, as well as alkali metal salts, ammonium salts, amine salts and quaternary ammonium salts thereof;
carboxylic acid compounds represented by

$Z^4$—$(CF_2CF_2)_m$—COOH wherein $Z^4$ represents F or Cl and in represents an integer of 3 to 13, as well as alkali metal salts, ammonium salts, amine salts and quaternary ammonium salts thereof; and
carboxylic acid compounds represented by

RfO—$(CF(CF_3)CF_2O)_r$—$CF(CF_3)$—$Z^5$ wherein Rf represents a perfluoroalkyl group containing 1 to 7 carbon atoms, r represents an integer of 0 to 10 and $Z^5$ represents —COOM or —$SO_3M$ in which M represents H, $NH_4$ or an alkali metal.

In carrying out the TFE polymerization, one or two or more such non-byproduct fluorine-containing surfactant may be added.

The TFE polymer aqueous dispersion of the invention can be obtained by any of the polymerization methods known in the art provided that the TFE polymerization is carried out in an aqueous medium in the presence of the above-mentioned fluorovinyl group-containing emulsifier.

The TFE polymerization is carried out generally after removal of dissolved air by repetitions of nitrogen feeding under pressure and degassing.

In the above-mentioned TFE polymerization, the fluorovinyl group-containing surfactant is preferably added in an amount of 0.00001 to 2% by mass relative to the aqueous medium.

When the level of addition of the fluorovinyl group-containing emulsifier is lower than 0.00001% by mass, the TFE polymer tends to form large particles insufficiently stable against settling. When it is higher than 2% by mass, the polymerization reactivity may be reduced, rather leading to failure to produce the effects of the use of the above-mentioned fluorovinyl group-containing surfactant in some instances.

A more preferred lower limit to the level of addition of the fluorovinyl group-containing emulsifier is 0.0001% by mass and a still more preferred lower limit is 0.001% by mass. A more preferred upper limit to the level of addition of the fluorovinyl group-containing surfactant is 1% by mass and a still more preferred upper limit is 0.5% by mass.

In the above-mentioned TFE polymerization, the total level of addition of the whole monomer or monomer composition can be properly determined according to the molecular weight and/or amount of the desired TFE polymer to be produced.

From the economy and/or productivity viewpoint, the total level of addition of the whole monomer or monomer composition is preferably not lower than 10% by mass relative to the aqueous medium and, the reaction system stability viewpoint, it is preferably not higher than 150% by mass relative to the aqueous medium.

A more preferred lower limit to the total level of addition of the whole monomer or monomer composition is 20% by mass relative to the aqueous medium, and a more preferred upper limit is 100% by mass and a still more preferred upper limit is 70% by mass.

The level of addition of the other monomer than TFE among the whole monomer composition can be adequately determined according to the composition of the desired TFE polymer.

In the TFE polymerization, TFE and the non-TFE monomer to be optionally added are generally fed either continuously or intermittently so that the pressure in the reaction system may be maintained within the range described later herein during the polymerization reaction.

The polymerization initiator mentioned above is preferably added in an amount of 0.005 to 1% by mass relative to the aqueous medium.

When the polymerization initiator is added in an amount smaller than 0.005% by mass relative to the aqueous medium, the polymerization rate tends to become extremely slow and, when it is added in an amount exceeding 1% by mass relative to the aqueous medium, the electrolyte concentration increases and the particles comprising the TFE polymer tend to become greater in particle diameter.

A more preferred lower limit to the above addition level is 0.01% by mass, and a more preferred upper limit to the addition level is 0.5% by mass.

The above-mentioned non-byproduct fluorine-containing surfactant can be added at levels that will not adversely affect the properties of the TFE polymer aqueous dispersion of the invention. Generally, it can be added at levels not exceeding 1% by mass relative to the aqueous medium. Preferably, the non-byproduct fluorine-containing surfactant is added at levels not exceeding 0.5% by mass, still more preferably at levels not exceeding 0.2% by mass. However, the above-mentioned TFE polymerization is preferably carried out in the absence of any non-byproduct fluorine-containing surfactant since then it becomes easy to treat the waste liquid possibly resulting from the TFE polymer aqueous dispersion obtained.

In the TFE polymerization, the addition of the fluorovinyl group-containing emulsifier is preferably carried out in the manner of a supplementary addition with the progress of the TFE polymerization reaction if need be.

When, in the TFE polymerization, the fluorovinyl group-containing emulsifier is carried out with such supplementary addition, the reactivity of TFE with the fluorovinyl group-containing compound is improved, so that the content of the fluorovinyl group-containing emulsifier in the TFE polymer aqueous dispersion obtained can be reduced and the content of the fluorine-containing surfactant, which is to be described later herein, can be reduced.

The above-mentioned supplementary addition may be continuous or intermittent. Thus, the emulsifier may be added before the start of the TFE polymerization reaction and then supplementally added continuously or intermittently, or the addition thereof may be started after the start of the TFE polymerization with the progress of the polymerization reaction, followed by continuous or intermittent supplementary addition, without addition thereof before the start of the polymerization reaction or at the initial stage of the polymerization reaction.

In the TFE polymerization, the addition of the non-byproduct fluorine-containing surfactant, too, may be carried out in the manner of the supplementary addition with the progress of the TFE polymerization reaction according to need, like the addition of the fluorovinyl group-containing emulsifier.

In the TFE polymerization, the reaction conditions such as temperature, pressure and polymerization time can be properly selected according to the amount of the TFE polymer aqueous dispersion to be prepared, the composition and concentration of the TFE polymer.

The TFE polymerization is generally carried out at a polymerization temperature of 10 to 100° C. and a polymerization pressure of 0.05 to 5 MPaG for 5 to 100 hours.

The TFE polymer aqueous dispersion of the invention is one obtained by the above-mentioned TFE polymerization and containing a particle comprising a TFE polymer dispersed in the aqueous medium mentioned above.

So long as it is one obtained by the above-mentioned TFE polymerization, the TFE polymer aqueous dispersion of the invention may be an aqueous dispersion as obtained just after the polymerization without carrying out such a procedure as dilution or concentration after the above-mentioned TFE polymerization or may be an aqueous dispersion obtained by carrying out such a procedure.

So long as it is one obtained by polymerizing TFE in an aqueous medium in the presence of the above-mentioned fluorovinyl group-containing emulsifier, the TFE polymer mentioned above is not particularly restricted but may be, for example, a TFE homopolymer or a modified polytetrafluoroethylene [modified PTFE] or a TFE copolymer derived from TFE and a monomer or monomers other than TFE.

Since the TFE polymer is obtained by carrying out the TFE polymerization in an aqueous medium in the presence of the above-mentioned fluorovinyl group-containing emulsifier, a part or parts of the polymer chain thereof may contain the above-mentioned fluorovinyl group-containing compound as added thereto.

The term "modified PTFE" as used herein means a non-melt-processable copolymer of TFE and a minor constituent monomer other than TFE.

The minor constituent monomer includes, among others, the above-mentioned perfluoroolefins, fluorohaloolefins, fluoro(alkyl vinyl ether) species, fluorinated cyclic monomers, and per fluoroalkylethylenes.

The minor constituent monomer-derived minor constituent monomer unit content in the above modified PTFE is generally within the range of 0.001 to 2 mole percent relative to all the monomer units.

The term "monomer unit", such as the minor constituent monomer unit mentioned above, as used herein means a part of the molecular structure of the TFE polymer which is that part derived from the corresponding monomer. Thus, for example, the TFE unit is a part of the molecular structure of the TFE polymer and is the segment derived from TFE as represented by —(CF$_2$—CF$_2$)—. The term "all the monomer units" as used hereinabove indicates all the monomer-derived segments occurring in the molecular structure of the TFE polymer.

The "monomer unit content relative to all the monomer units" is the value determined by subjecting the TFE polymer to molten-state NMR measurement.

The "minor constituent monomer unit content (mole percent) relative to all the monomer units" so referred to herein means the proportion (mole percent) of the minor constituent monomer from which the minor constituent monomer unit is derived to the monomers from which "all the monomer units" mentioned above are derived, namely the total amount of the monomers constituting the TFE polymer.

The term "TFE copolymer" as used herein means a copolymer of TFE and at least one monomer other than TFE, with the content of the monomer unit derived from the monomer other than TFE relative to all the monomer units exceeding 2 mole percent.

In the above-mentioned TFE copolymer, the monomer other than TFE is not particularly restricted but includes, among others, the above-mentioned fluorine-containing monomers and fluorine-free monomers.

The TFE copolymer may be, for example, a melt-processable fluoropolymer.

The melt-processable fluoropolymer preferably has a melt viscosity of not higher than $10^9$ Pa/s at 380° C.

The melt-processable fluoropolymer is, for example, a fluoropolymer constituting a melt-processable fluororesin or an elastomeric fluorine-Containing copolymer.

The melt-processable fluororesin-constituting fluoropolymer includes, among others, ethylene/TFE copolymers [ETFEs], TFE/HFP copolymers [FEPs] and TFE/perfluoro(alkyl vinyl ether) copolymers [TFE/PFVE copolymers].

As the TFE/PFVE copolymers, there may be mentioned TFE/PMVE copolymers [MFAs], TFE/PEVE copolymers and TFE/PPVE copolymers [PFAs] and, among them, MFAs and PFAs are preferred, and PFAs are more preferred.

The above-mentioned elastomeric copolymer includes TFE/propylene copolymers and HFP/ethylene/TFE copolymers, among others.

The TFE polymer mentioned above preferably has a TFE unit content exceeding 40 mole percent relative to all the monomer units since the polymer then becomes excellent in thermal stability and other physical properties and easy to handle.

The TFE polymer more preferably has a TFE unit content of 60 mole percent or higher, still more preferably 95 mole or higher, relative to all the monomer units.

The TFE polymer may be a non-perfluoro-based polymer other than the perfluoro-based polymer described later herein but preferably is a perfluoro-based polymer since such polymer is excellent in thermal stability and other physical properties and easy to handle.

The "perfluoro-based polymer" so referred to herein includes, within the meaning thereof, a perfluoropolymer obtained by polymerizing a perfluoromonomer(s) alone or a fluoropolymer obtained by using, as a comonomer, a non-perfluoro compound at usage levels at which the physical properties of the above-mentioned perfluoropolymer will not be deteriorated.

As the perfluoro-based polymer, there may be mentioned, for example, fluorine-free functional group- and/or C—H bond-containing fluoropolymers.

The perfluoro-based polymer preferably has a perfluoro unit content of not lower than 90 mole percent, more preferably not lower than 95 mole percent, still more preferably not lower than 98 mole percent, relative to all the monomer units.

The perfluoro-based polymer mentioned above may contain any kind of monomer unit in addition to TFE so long as it comes under the definition given above.

The TFE polymer is more preferably a perfluoro-based polymer having a TFE unit content exceeding 40 mole percent relative to all the monomer units, still more preferably a perfluoro-based polymer having a TFE unit content exceeding 60 mole percent relative to all the monomer units, most preferably a perfluoro-based polymer having a TFE unit content exceeding 95 mole percent relative to all the monomer units, since such a polymer is excellent in thermal stability and other physical properties and easy to handle.

The TFE polymer in the TFE polymer aqueous dispersion of the invention generally has a number average molecular weight of 100000 to 20000000. A preferred lower limit to the average molecular weight of the TFE polymer is 500000 from the moldability/processability viewpoint, and a preferred upper limit is 10000000.

The average molecular weight of the TFE polymer, so referred to herein, is the value obtained based on the standard specific gravity (SSG) measured according to ASTM D 1457-69. The particles comprising the TFE polymer in the TFE polymer aqueous dispersion of the invention preferably have an average primary particle diameter of 50 to 500 nm.

When the average primary particle diameter is smaller than 50 nm, an increase in TFE polymer concentration tends to result in a rapid increase in the viscosity of the TFE polymer aqueous dispersion and, when the average primary particle diameter is greater than 500 nm, the dispersion stability and mechanical stability, among others, of the TFE polymer aqueous dispersion tend to decrease.

A preferred lower limit to the above-mentioned average primary particle diameter is 100 nm, and a more preferred lower limit is 150 nm. A preferred upper limit to the average primary particle diameter is 400 nm, and a more preferred upper limit is 350 nm.

The average primary particle diameter can be adjusted by selecting or specifying the level of addition of the fluorovinyl group-containing emulsifier for use in the TFE polymerization, the supplementary addition of the fluorovinyl group-containing emulsifier, the polymerization pressure, the minor constituent monomer species and the content thereof in the modified PTFE and so forth.

The term "average primary particle diameter" as used herein means the average primary particle diameter of the particles comprising the TFE polymer in the TFE polymer aqueous dispersion as obtained after polymerization and not yet subjected to such a procedure as dilution or concentration.

The average primary particle diameter is the value determined indirectly using a working curve showing the relation between the transmittance for incident light at 550 nm per unit length and the average particle diameter determined by electron photomicrography as constructed with a TFE polymer aqueous dispersion adjusted to a predetermined solid matter concentration and measuring such transmittance of the TFE polymer aqueous dispersion which is the target of measurement.

The TFE polymer aqueous dispersion of the invention has a fluorine-containing surfactant content of not higher than 1000 ppm based on the mass of the TFE polymer aqueous dispersion.

The fluorine-containing surfactant concentration, so referred to herein, is measured by extracting, under refluxing, the aqueous dispersion obtained with such a solvent as methanol used as the extractant, fractionating the thus-recovered extract by column chromatography and comparing the data obtained with the data for a standard aqueous solution having a concentration of 1000 ppm.

The term "fluorine-containing surfactant" as used herein means the sum total of all surfactants that occur in the above-mentioned aqueous dispersion and have at least one fluorine atom in the molecular structure thereof. As the fluorine-containing surfactant, there may be mentioned, for example, (1) fluorovinyl group-containing emulsifiers, (2) short-chain byproduct fluorine-containing carboxylic acid compounds, (3) non-byproduct fluorine-containing surfactants, and (4) monomer-added fluorovinyl group-containing emulsifiers.

The above-mentioned fluorine-containing surfactant content is preferably not higher than 100 ppm, more preferably not higher than 50 ppm, still more preferably not higher than 30 ppm, based on the mass of the TFE polymer aqueous dispersion since the waste liquid resulting from the TFE polymer aqueous dispersion then becomes easy to treat.

Among the fluorine-containing surfactants enumerated above, the fluorovinyl group-containing emulsifiers (1) and non-byproduct fluorine-containing surfactants (3) are those described hereinabove.

The short-chain byproduct fluorine-containing carboxylic acid compounds (2) include, within the meaning thereof, those short-chain carboxylic acid compounds derived from such a monomer as TFE and formed as byproducts when a persulfate salt such as ammonium persulfate [APS] or an organic peroxide such as disuccinoyl peroxide [DSP] is used as a polymerization initiator in the above-mentioned TFE polymerization. The short-chain byproduct fluorine-containing carboxylic acid compounds has a —COOH terminus formed upon addition of a persulfate-derived radical ($.OSO_3M$ [M representing H, $NH_4$ or an alkali metal]) or an organic peroxide-derived radical ($.OR^3$ [$R^3$ representing an organic group]) to a monomer-based short chain terminus, followed by decomposition.

The short-chain byproduct fluorine-containing carboxylic acid compounds are fluorine-containing compounds containing, as a hydrophobic group, an oligomer moiety derived from 1 to about 5 molecules of such a monomer as TFE and, as a hydrophilic group, the —COOH terminus and therefore act as surfactants. The rate of polymerization reaction is very rapid in the above-mentioned TFE polymerization and the oligomer formation percentage is very low, so that the short-chain fluorine-containing carboxylic acid compounds are scarcely formed. Therefore, the TFE polymer aqueous dispersion of the invention as obtained by TFE polymerization contains substantially no short-chain byproduct fluorine-containing carboxylic acid compounds, so that the fluorine-containing surfactant content therein is low.

The monomer-added fluorovinyl group-containing emulsifiers (4) are formed as byproducts in the TFE polymerization mentioned above and are those emulsifiers which comprise compounds resulting from addition of oligomers composed of one to about molecules of such a monomer as TFE to the above-mentioned fluorovinyl group-containing compound. The rate of polymerization reaction in the above-mentioned TFE polymerization is very fast and the polymerization reaction progresses under incorporation of the above-mentioned fluorovinyl group-containing compound into polymer chains. Therefore, the proportions of the unreacted monomer(s) and the above-mentioned oligomers occurring in the aqueous dispersion obtained are very small and the residual amount of the fluorovinyl group-containing compound therein is very small, so that such monomer-added fluorovinyl group-containing emulsifiers are hardly formed. Thus, the TFE polymer aqueous dispersion of the invention as obtained by the above-mentioned TFE polymerization is substantially free of such monomer-added fluorovinyl group-containing emulsifiers and, accordingly, it is low in the content of the above-mentioned fluorine-containing surfactants.

Since the TFE polymer aqueous dispersion of the invention is obtained by TFE polymerization in the further presence of the above-mentioned fluorovinyl group-containing emulsifier, the TFE polymer generally comprises molecules resulting from addition of the above-mentioned fluorovinyl group-containing compound to the molecular structure thereof.

Upon addition of the fluorovinyl group-containing compound to the TFE polymer, the carboxylate group [—$COO^-$] derived from the fluorovinyl group-containing compound takes its position on the surface of particle comprising the TFE polymer, so that the particles comprising the TFE polymer themselves become improved in dispersion stability. Therefore, the TFE polymer aqueous dispersion of the invention can have good dispersion stability even when the fluorine-containing surfactant content is not higher than 1000 ppm by mass relative to the aqueous medium.

Even when it is just as obtained by the above-mentioned TFE polymerization, the TFE polymer aqueous dispersion of the invention is low in fluorine-containing surfactant content and shows good moldability/processability. Preferably, however, the fluorine-containing surfactant is removed by such a known purification method as phase separation or ion exchange treatment.

The solid matter concentration in the TFE polymer aqueous dispersion of the invention is generally 5 to 70% by mass. When the solid matter concentration is higher than 70% by mass, the stability of the TFE polymer aqueous dispersion itself tends to decrease. The solid matter concentration can be properly adjusted by selecting the level of addition of the monomer TFE and/or the above-mentioned monomer(s) other than TFE.

Preferably, the TFE polymer aqueous dispersion of the invention has a solid matter concentration of 5 to 65% by mass.

A more preferred lower limit to the above solid matter concentration is 10% by mass in view of the recovery rate in recovering the TFE polymer by coagulation or flocculation, and a more preferred lower limit is 20% by mass from the better purification efficiency viewpoint.

A more preferred upper limit to the above solid matter concentration is 40% by mass in view of the possibility of the solid matter in the TFE polymer aqueous dispersion in the vessel being prevented from adhering to the vessel wall.

The "solid matter concentration" so referred to herein is the value determined based on the mass loss after drying the TFE polymer aqueous dispersion at 150° C. for 1 hour.

When one or more of such known compounding ingredients as pigments, thickening agents, dispersants, antifoaming agents, antifreezing agents and film-forming auxiliaries are incorporated therein or one or more further other polymer compounds are compositely used therewith, the TFE polymer aqueous dispersion of the invention can be used as a water-based coating paint.

As the use of the TFE polymer aqueous dispersion of the invention, there may also be mentioned the use thereof in the form of a powder obtained by subjecting the TFE polymer aqueous dispersion to coagulation or flocculation and drying the thus-recovered solid matter, if desired followed by granulation.

The TFE polymer powder obtained by coagulating the above-mentioned TFE polymer aqueous dispersion also constitutes an aspect of the present invention.

The coagulation is generally effected by diluting the aqueous dispersion obtained by emulsion polymerization, for example a polymer latex, with water to a polymer concentration of 10 to 20% by mass, optionally adjusting the pH to neutrality or alkalinity, and stirring the dilution in a vessel equipped with a stirrer more vigorously than during the reaction.

In the above coagulation, the stirring may also be carried out while adding, as a coagulant, a water-soluble organic compound such as methanol or acetone, or an inorganic salt such as potassium nitrate or ammonium carbonate or an inorganic acid such as hydrochloric acid, sulfuric acid or nitric acid.

A pigment- and/or filler-containing TFE polymer fine powder with the pigment(s) and/or filler(s) homogeneously mixed therein can also be obtained by adding a pigment or pigments for coloration and/or one or more of various fillers for improving mechanical characteristics before or during the above coagulation.

The coagulation may also be carried out continuously using in-line mixers, for instance.

The drying of the wet powder obtained by the above coagulation is generally carried out by such means as vacuum, high frequency or hot air while maintaining a state in which the wet powder is not caused to flow excessively, preferably in a state of standing still.

When the TFE polymer occurs as a fine powder, friction among powder particles, in particular at elevated temperatures, is generally unfavorable since a weak shearing force can readily fibrillate the particles comprising the TFE polymer; upon fibrillation, the particles lose their original stable particle structure.

The above-mentioned drying is carried out at a drying temperature of 10 to 250° C., preferably 100 to 200° C.

The TFE polymer powder of the invention generally has an average particle diameter of 50 μm to 1000 μm. A preferred lower limit to the average particle diameter is 100 μm from the moldability/processability viewpoint, among others, and a preferred upper limit is 700 μm.

The "average particle diameter of the TFE polymer powder of the invention", so referred to herein, is the value measured by means of a scanning electron microscope.

The TFE polymer powder of the invention, which is obtained from the TFE polymer aqueous dispersion of the invention, shows good moldability/processability and is useful as a raw material for producing TFE polymer moldings excellent in mechanical characteristics and other physical properties.

The TFE polymer powder of the invention, when it is a TFE polymer fine powder, is preferably used for molding purposes, in particular, and suitable fields of application thereof include tubes and the like for use in hydraulic systems and fuel systems in aircrafts, automobiles and the like, flexible hoses for liquid chemicals, steam and the like, and electric wire coverings, among others.

The TFE polymer moldings obtained by molding/processing using the TFE polymer aqueous dispersion of the invention or the TFE polymer powder of the invention also constitutes an aspect of the present invention.

The TFE polymer moldings of the invention may be in the form of pellets, molded articles, coatings or cast films.

In the present specification, the production of the pellets, the production of the molded articles, the production of the coatings and/or the production of the cast films is sometimes referred to "molding/processing".

The above molding/processing can be properly carried out by one of the methods known in the art.

Among the molding/processing methods, the method of producing pellets is not particularly restricted but may be, for example, the method comprising feeding the TFE polymer powder of the invention to a kneader or extruder, followed by melting and kneading to produce pellets.

The method of producing molded articles is not particularly restricted but may include, among others, compression molding, extrusion molding, paste extrusion moldings, and injection molding.

The coating processing is generally carried out by applying the above-mentioned TFE polymer aqueous dispersion to articles or substrates to be coated. The method of application in the coating processing is not particularly restricted but includes, among others, spray coating, dip coating, brush coating, and electrostatic coating.

In the above coating processing, a composition obtained by adding a nonionic surfactant to the TFE polymer aqueous dispersion prior to application to thereby stabilize the TFE polymer aqueous dispersion, followed by further concentration and addition of an organic or inorganic filler(s) according to the intended use can be applied. Such composition, when applied to metal or ceramic substrates, can give coat surfaces having nonstickiness and a low coefficient of friction and excellent in gloss, smoothness, wear resistance, weather resistance and thermal stability. It is thus suited for coating rolls, cooking utensils and the like and for dip coating of glass cloths, among others.

As for the method of cast film formation, there may be mentioned, for example, the method comprising applying the dispersion to a substrate and, after drying, peeling off the coat film from the substrate, if desired, by placing the coated substrate in water, for instance.

The molding/processing conditions can adequately selected according to the method of molding/processing and the composition and amount of the TFE polymer to be subjected to molding/processing, among others.

The TFE polymer moldings of the invention, which are obtained from the TFE polymer aqueous dispersion of the invention or the TFE polymer powder of the invention, are excellent in durability, weather resistance, surface characteristics, mechanical characteristics and other physical properties.

The method of producing a TFE polymer aqueous dispersions according to the invention comprises carrying out the TFE polymerization in an aqueous medium in the presence of a fluorovinyl group-containing emulsifier.

The fluorovinyl group-containing emulsifier, TFE and aqueous medium species, addition levels and preferred ranges thereof to be used or employed in the method of producing a TFE polymer aqueous dispersion according to the invention are the same as those described hereinabove referring to the TFE polymer aqueous dispersion of the invention.

In carrying out the method of producing a TFE polymer aqueous dispersion according to the invention, the fluorovinyl group-containing emulsifier is added in an amount of 0.00001 to 2% by mass relative to the aqueous medium.

In carrying out the method of producing a TFE polymer aqueous dispersion of the invention, it is also possible to use any of those monomers other than TFE and non-byproduct fluorovinyl group-containing surfactants and other materials mentioned hereinabove referring to the TFE polymer aqueous dispersion of the present invention.

However, the method of producing a TFE polymer aqueous dispersion according to the invention preferably comprises carrying out the TFE polymerization in an aqueous medium in the absence of the non-byproduct fluorine-containing surfactant since the treatment of the liquid waste possibly coming from the TFE polymer aqueous dispersion obtained becomes easy then.

In the method of producing a TFE polymer aqueous dispersion according to the invention, the addition of the fluorovinyl group-containing emulsifier is preferably carried out in the manner of a supplementary addition with the progress of the TFE polymerization reaction.

When, in the method of producing a TFE polymer aqueous dispersion according to the invention, the addition of the fluorovinyl group-containing emulsifier is carried out in the above-mentioned manner of the supplementary addition, the reactivity between TFE and the fluorovinyl group-containing compound in the TFE polymerization becomes better, so that the TFE polymer aqueous dispersion obtained is low in the content of the fluorovinyl group-containing emulsifier, namely the fluorine-containing surfactant mentioned above.

In the method of producing a TFE polymer aqueous dispersion according to the invention, the above-mentioned supplementary addition can be carried out in the same manner as described hereinabove referring to the TFE polymer aqueous dispersion of the invention.

The TFE polymer aqueous dispersion obtained by the method of producing a TFE polymer aqueous dispersion according to the invention each contains a particle comprising a TFE polymer dispersed in the aqueous medium and the content of the fluorine-containing surfactant therein is not higher than 1000 ppm by mass.

The above-mentioned TFE polymer and particle comprising the TFE polymer in each of the TFE polymer aqueous dispersion obtained by the method of producing a TFE polymer aqueous dispersion according to the invention are respectively the same as described hereinabove referring to the TFE polymer aqueous dispersion of the invention.

The above-mentioned particle comprising the TFE polymer is the particle resulting from addition of the above-mentioned fluorovinyl group-containing compound to the above-mentioned TFE polymer, and they may have the fluorovinyl group-containing compound-derived carboxylate groups positioned on the particle surface. Such particle comprising the TFE polymer is itself excellent in dispersion stability and, therefore, the TFE polymer aqueous dispersion obtained by the method of producing a TFE polymer aqueous dispersion according to the invention is excellent in dispersion stability in spite of the fact that the fluorine-containing surfactant content is not higher than 1000 ppm by mass.

Effects of the Invention

The TFE polymer aqueous dispersion of the invention, which has the above-mentioned constitution, is stable at a high solid matter concentration and is generally excellent in moldability/processability and, therefore, it is useful as a raw material for producing a TFE polymer powder or a TFE polymer molding. The TFE polymer aqueous dispersion of the invention is very low in fluorine-containing surfactant content and is industrially useful since that fact facilitates the treatment of the liquid waste formed upon molding/processing thereof, among others.

The TFE polymer powder of the invention and the TFE polymer molding of the invention are obtained from the TFE polymer aqueous dispersion of the invention and, therefore, the TFE polymer powder of the invention is excellent in moldability/processability and the TFE polymer molding of the invention is excellent in mechanical characteristics and other physical properties.

The method of producing a TFE polymer aqueous dispersion according to the invention, which has the constitution described above, can give TFE polymer aqueous dispersions very low in fluorine-containing surfactant content and, therefore, is useful.

BEST MODES FOR CARRYING OUT THE INVENTION

The following examples are further illustrative of the present invention. These examples are, however, by no means limitative of the scope of the invention.

Example 1

Preparation of the TFE Polymer Aqueous Dispersion

A 3-liter stainless steel autoclave equipped with a stirring impeller was charged with 1.5 liters of deionized water, 60 g of paraffin wax (melting point 60° C.) and 700 mg of fluorovinyl group-containing compound 1 [$CF_2$=$CFOCF_2CF(CF_3)OCF_2CF_2CF_2SO_3Na$], and the system inside was purged with TFE. The inside temperature was raised to 70°

C., and the autoclave was charged with TFE under pressure until arrival of the inside pressure at 0.78 MPa and further charged with 5 g of a 0.6% (by mass) aqueous solution of ammonium persulfate [APS] to initiate the TFE polymerization reaction. Since otherwise the polymerization system inside pressure would lower with the progress of the polymerization, the reaction was continued while the inside pressure was maintained at 0.78 MPa by continuous additional feeding of TFE. At 6.5 hours after the start of the polymerization, the remaining TFE was purged off and the polymerization was discontinued. The aqueous dispersion obtained was subjected to the following measurements (1) to (5).

(1) Solid matter concentration: The aqueous dispersion obtained was dried at 150° C. for 1 hour and that concentration was calculated based on the resulting loss in mass.

(2) Average primary particle diameter: The dispersion was diluted to a solid matter concentration of about 0.02% by mass, the transmittance for incident light at 550 nm per unit length was measured and that diameter was indirectly determined based on a working curve constructed so as to show the relation between such transmittance and the average particle diameter determined by electron photomicrography.

fluorovinyl group-containing compound 1. They were subjected to the measurements (1) to (5).

Compound 2: $CF_2=CFOCF_2CF_2CF_2-COONa$
Compound 3: $CH_2=CFCF_2O-(CF(CF_3)CF_2O)_2CF(CF_3)-COONH_4$
Compound 4: $CH_2=CF-CF_2OCF(CF_3)-CF_2OCF(CF_3)-COONH_4$
Compound 5: $CH_2=CF-CF_2OCF(CF_3)-COONH_4$
Compound 6: $CF_2=CF-CF_2CF_2-COONH_4$ Example 7

Preparation of a TFE Polymer Aqueous Dispersion

A TFE polymer aqueous dispersion was prepared in the same manner as in Example 4 except that 110 mg of Compound 4 was added prior to polymerization and five 110-mg portions thereof were further added at hourly intervals during the polymerization reaction. The dispersion was subjected to the measurements (1) to (5).

The measurement results in each example are shown in Table 1.

TABLE 1

| | Amount of compound used (mg) | Polymerization time (hours) | Solid matter concentration (mass %) | Average primary particle diameter (nm) | AI value | SSG | Fluorine-containing surfactant concentration (ppm) |
|---|---|---|---|---|---|---|---|
| Example 1 | 700 | 6.5 | 19.2 | 206 | 0.081 | 2.205 | 46 |
| Example 2 | 470 | 7.0 | 14.4 | 175 | 0.143 | 2.232 | 28 |
| Example 3 | 908 | 3.7 | 13.3 | 182 | 0.068 | 2.218 | 25 |
| Example 4 | 660 | 3.1 | 11.8 | 180 | 0.074 | 2.238 | 18 |
| Example 5 | 410 | 3.0 | 10.5 | 176 | 0.082 | 2.242 | 19 |
| Example 6 | 290 | 1.5 | 5.2 | 281 | 0.121 | 2.225 | 29 |
| Example 7 | 660 | 5.7 | 25.6 | 200 | 0.079 | 2.222 | 7 |

(3) AI (amorphous index): A 150-μm-thick film was prepared using a press and subjected to IR absorbance measurement, and the ratio of the absorbance at 778 cm$^{-1}$ to the absorbance at 2367 cm$^{-1}$ was calculated as the AI value. The AI is an indicator of crystallinity, and a lower AI value is considered to indicate that the introduction of the fluorovinyl group-containing compound is less influential.

(4) Standard specific gravity (SSG): The SSG was determined according to ASTM D 1457-69.

(5) Fluorine-containing surfactant concentration: The aqueous dispersion obtained was dried at 50° C. for 1 hour, a 1-g portion of the solid matter obtained was added to 50 g of methanol, extraction was carried out under refluxing at the boiling point of methanol, the extract recovered was fractionated by column chromatography (apparatus: TOSOH HPLC-8000, column ODS-120T 150 mm×4.6 mm φ, mobile phase acetonitrile/0.05 mole percent phosphate buffer (pH 6)=6/4, flow rate 1 ml/minute), and the concentration in question was determined by comparison with the data obtained for a standard aqueous solution having a fluorine-containing surfactant concentration of 1000 ppm and expressed in mass concentration.

Examples 2 to 6

Preparation of TFE Polymer Aqueous Dispersions

TFE polymer aqueous dispersions were prepared in the same manner as in Example 1 except that the fluorovinyl group-containing compounds 2 to 6 specified below (hereinafter, Compounds 2 to 6) were respectively used in lieu of As shown in Table 1, the TFE polymer aqueous dispersions obtained in Examples 1 to 7 were very low in fluorine-containing surfactant concentration. In particular, the TFE polymer aqueous dispersion obtained in Example 7 was lower in fluorine-containing surfactant concentration and higher in solid matter concentration than the TFE polymer aqueous dispersion obtained in Example 4, revealing that those obtained by the supplementary addition of the fluorovinyl group-containing compound are preferred as the TFE polymer aqueous dispersions of the invention.

INDUSTRIAL APPLICABILITY

The TFE polymer aqueous dispersion of the invention, which has the above-mentioned constitution, is high in TFE polymer concentration, is stable and is generally excellent in moldability/processability as well and, therefore, it is useful in the production of a TFE polymer powder or TFE polymer moldings. The TFE polymer aqueous dispersion of the invention is very low in fluorine-containing surfactant content and is useful since that fact facilitates the treatment of the liquid waste formed upon molding/processing of the TFE polymer aqueous dispersion, among others.

The TFE polymer powder of the invention and the TFE polymer moldings of the invention are obtained from the TFE polymer aqueous dispersion of the invention and, therefore, the TFE polymer powder of the invention is excellent in moldability/processability and the TFE polymer moldings of the invention are excellent in mechanical characteristics and other physical properties.

The method of producing TFE polymer aqueous dispersion according to the invention, which has the constitution described above, can give TFE polymer aqueous dispersions very low in fluorine-containing surfactant content and, therefore, is useful.

The invention claimed is:

1. A method of producing a tetrafluoroethylene polymer aqueous dispersion by carrying out a tetrafluoroethylene polymerization in an aqueous medium in the presence of a fluorovinyl group-containing emulsifier, wherein the tetrafluoroethylene polymer has a tetrafluoroethylene unit content exceeding 95 mole percent, wherein said tetrafluoroethylene polymer aqueous dispersion contains a particle comprising a tetrafluoroethylene polymer dispersed in said aqueous medium and has a fluorine-containing surfactant content of not higher than 1000 ppm by mass, said fluorovinyl group-containing emulsifier is added in an amount of 0.00001 to 0.06% by mass relative to said aqueous medium, and said fluorovinyl group-containing emulsifier comprises a fluorovinyl group-containing compound (V) represented by the general formula (V):

$$CH_2=CFCF_2O-(CF(CF_3)CF_2O)_f-CF(CF_3)-Y \quad (V)$$

wherein f represents 0 or 1 and Y represents —SO$_3$M or —COOM in which M represents H, NH$_4$ or an alkali metal.

2. The method of producing a tetrafluoroethylene polymer aqueous dispersion according to claim 1, wherein the addition of the fluorovinyl group-containing emulsifier is carried out in the manner of a supplementary addition with the progress of a tetrafluoroethylene polymerization reaction.

3. The method of producing a tetrafluoroethylene polymer aqueous dispersion according to claim 1, wherein the average primary particle diameter is from 175-281 nm.

* * * * *